United States Patent
Haack

(10) Patent No.: US 8,631,911 B2
(45) Date of Patent: Jan. 21, 2014

(54) RETAINING PLATE FOR THE HAND BRAKE LEVER OF A DRUM BRAKE DURING INITIAL ASSEMBLY FOR GENERATING A LASTING INITIAL TENSION OF THE BOWDEN CABLE

(75) Inventor: Oliver Haack, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 506 days.

(21) Appl. No.: 12/672,571

(22) PCT Filed: Jul. 24, 2008

(86) PCT No.: PCT/EP2008/006093
§ 371 (c)(1),
(2), (4) Date: Jan. 13, 2011

(87) PCT Pub. No.: WO2009/018927
PCT Pub. Date: Feb. 12, 2009

(65) Prior Publication Data
US 2011/0094838 A1    Apr. 28, 2011

(30) Foreign Application Priority Data
Aug. 9, 2007 (DE) .......................... 10 2007 037 671

(51) Int. Cl.
*F16D 65/14* (2006.01)
(52) U.S. Cl.
USPC ........................................ 188/2 D; 188/325
(58) Field of Classification Search
USPC ............ 188/79.52, 79.55–79.59, 79.61, 325, 188/327, 328, 2 D
See application file for complete search history.

(56) References Cited

U.S. PATENT DOCUMENTS

| | | | | |
|---|---|---|---|---|
| 1,870,296 A * | 8/1932 | Schnell | ................ | 188/340 |
| 2,292,017 A | 8/1942 | Smith | | |
| 3,068,964 A * | 12/1962 | Cox, Jr. et al. | ............. | 188/79.62 |
| 3,227,247 A * | 1/1966 | Sherretts et al. | ........... | 188/79.57 |
| 3,570,632 A * | 3/1971 | Williams | .................. | 188/79.57 |
| 3,963,100 A | 6/1976 | Kaub | | |
| 4,854,426 A | 8/1989 | Solano et al. | | |
| 5,720,367 A * | 2/1998 | Evans | ................. | 188/79.64 |
| 6,241,051 B1 * | 6/2001 | Ohnishi et al. | ................ | 188/2 D |
| 6,502,670 B1 * | 1/2003 | Asai | ................. | 188/2 D |

(Continued)

FOREIGN PATENT DOCUMENTS

| | | |
|---|---|---|
| DE | 315182 C | 9/1918 |
| DE | 444779 C | 5/1927 |

(Continued)

*Primary Examiner* — Robert A Siconolfi
*Assistant Examiner* — Charles Poon
(74) *Attorney, Agent, or Firm* — MacMillan, Sobanski & Todd, LLC

(57) ABSTRACT

A drum brake for motor vehicles is described, comprising a hydraulically actuable service brake and a parking brake that is actuable mechanically by means of a Bowden cable, wherein a lasting initial tension of the Bowden cable is to be ensured. For the initial assembly, a retaining plate interlocks the hand brake lever with the web plate of the secondary shoe against the force of the resetting spring. After assembly of the Bowden cable and adjustment of the initial tension of the hand brake cable the interlock is cancelled by pulling powerfully on the hand brake stem. If over the years the hand brake cable stretches, a design-determined initial tension is constantly maintained by the continuous force of the resetting spring.

8 Claims, 14 Drawing Sheets

(56) References Cited

U.S. PATENT DOCUMENTS

| | | | |
|---|---|---|---|
| 6,874,600 | B2 | 4/2005 | Grundke |
| RE40,760 | E | 6/2009 | Krug et al. |
| 7,575,104 | B2 * | 8/2009 | Ikeda et al. ............... 188/2 D |
| 2004/0159506 | A1 * | 8/2004 | Ikeda ............................ 188/78 |
| 2006/0151264 | A1 * | 7/2006 | Ikeda ....................... 188/79.51 |
| 2007/0068743 | A1 * | 3/2007 | Tessitore ...................... 188/2 D |

FOREIGN PATENT DOCUMENTS

| | | | |
|---|---|---|---|
| DE | 696200 C | 3/1941 | |
| DE | 1030982 B | 5/1958 | |
| DE | 2508614 A1 | 8/1975 | |
| DE | 3103708 A1 | 8/1982 | |
| DE | 3819177 A1 | 1/1989 | |
| DE | 3741530 A1 | 6/1989 | |
| DE | 8811920 U1 | 1/1990 | |
| DE | 4023047 A1 | 1/1992 | |
| DE | 4040779 A1 | 6/1992 | |
| DE | 9209637 U1 | 11/1993 | |
| DE | 19734572 A1 | 10/1998 | |
| DE | 10220016 A1 | 11/2003 | |
| EP | 0579178 A1 | 1/1994 | |
| EP | 1136718 A1 | 9/2001 | |
| FR | 668053 A | 10/1929 | |
| FR | 2161654 A5 | 7/1973 | |
| GB | 2088501 A | 6/1982 | |
| JP | 10220506 A * | 8/1998 | ............. F16D 65/30 |

* cited by examiner

RETAINING PLATE FOR THE HAND BRAKE LEVER OF A DRUM BRAKE DURING INITIAL ASSEMBLY FOR GENERATING A LASTING INITIAL TENSION OF THE BOWDEN CABLE

CROSS-REFERENCE TO RELATED APPLICATIONS

This application is a national stage of International Application No. PCT/EP2008/006093 filed Jul. 24, 2008, the disclosures of which are incorporated herein by reference in entirety, and which claimed priority to German Patent Application No. 10 2007 037 671.7 filed Aug. 9, 2007, the disclosures of which are incorporated herein by reference entirety.

BACKGROUND OF THE INVENTION

The invention relates to a retaining plate for the hand brake lever of a drum brake during initial assembly for generating a lasting initial tension of the Bowden cable.

Drum brakes for currently conventional cars are used both for the service brake and also to a particular extent for the parking brake. Drum brakes have been tried and tested for many decades.

They conventionally comprise two arc-shaped brake shoes, which are carried and supported on an anchor plate. A brake drum transmits the rotational movement of the wheel to be braked or the torque of a wheel to be prevented from rotating to the brake shoes. For this purpose, the brake shoes are moved towards the brake drum and brought into frictional engagement therewith. The driving force of the brake drum taken up by the brake shoes support them in the anchor plate.

In order to bring the brake shoes into frictional engagement with the brake drum, a wheel brake cylinder is provided for the service brake and contains two pistons, which upon loading by means of hydraulic pressure move the brake shoes towards the brake drum and press them against the brake drum. The generation of the hydraulic pressure occurs as a result of depressing the brake pedal, as a result of which in the master cylinder a piston presses hydraulic fluid through the brake line to the wheel brake cylinder.

For the parking brake a Bowden cable is provided, one end of which terminates in the passenger compartment, its sheath being supported on the bracket, and the hand brake cable is connected to the hand brake stem, wherein by pulling the hand brake stem a tensile force is exerted on the hand brake cable, and the other end of which terminates in the drum brake, the sheath being supported on the anchor plate, and the tensile force generated by the hand brake stem pulls by means of the hand brake cable on the hand brake lever, which therefore moves the two brake shoes apart from one another and presses them against the brake drum.

Depending on the nature of initiation of the actuating force and the nature of support of the friction force generated by the brake drum into the anchor plate, the ratio of the generated friction force to the applied actuating force may be controlled within wide limits such that a high self-boosting forms the one limit, at the price of a high tendency to lock and a large influence of the coefficient of friction between the friction surfaces, and a low ratio of generated friction force to applied actuating force forms the other limit, with the advantage of a low influence of the coefficient of friction on the generated friction force, i.e. a very stable brake.

Whereas previously power brakes, drum brakes with high self-boosting, were used in many cases, since the development and use of brake boosters more value has been placed on the stability of the brake.

For this reason nowadays a drum brake construction is mainly used, which comprises two brake shoes, of which the one, the primary shoe, has a leading action and the other, the secondary shoe, has a trailing action. Such a drum brake has a high efficiency combined with a low tendency to lock.

As time passes, the brake linings as well as the brake drum wear. In order to compensate this wear—for in the conventional hydraulically actuated brakes the actuating travel of the brake pedal and hence also the quantity of hydraulic fluid displaceable in the master cylinder are limited, as is the actuating travel of the hand brake stem and hence also the distance by which the hand brake cable may be pulled out of the sheath—these drum brakes are equipped with an automatic readjustment device.

Automatic readjustment devices for drum brakes very often operate by means of a variable-length strut, which is disposed between the two brake shoes and the length of which is increased in dependence upon the wear by means of a pawl and ratchet wheel mechanism. Such readjustment devices are known for example from the patent documents DE 2 508 614, and corresponding U.S. Pat. No. 3,963,100, both of which are incorporated by reference herein, FR 2 161 654 and U.S. Pat. No. 2,292,017.

These automatic readjustment devices generally only have the effect that the spacing between the friction surface of the brake drum and the friction surfaces of the brake shoes is as constant as possible. This relates both to the wear of the friction material and the wear of the brake drum. If the brake shoes are readjusted by means of the strut and the pawl and ratchet wheel mechanism, then the pistons in the wheel brake cylinder take up a new position, for example a helical compression spring disposed between the pistons presses the pistons apart from one another. Hydraulic fluid flows from the storage tank via the master cylinder and fills the enlarged space between the pistons. Also, by means of the strut the hand brake lever is readjusted. Both service brake and parking brake as such operate very reliably for years.

However, over the years the Bowden cable yields. A certain cable slack arises. This has the effect that, despite a correctly readjusted brake, upon pulling the hand brake stem the immobilizing effect occurs later, the hand brake stem has to be pulled a few teeth further before the original immobilizing effect arises.

This yielding was previously compensated by readjusting the Bowden cable during servicing. In the background art constructions are also known, which readjusted the wear and stretching of the cable pulls or linkages in the region of the operating lever by means of clamp-type locking mechanisms, wherein the clamping bodies are balls, or by means of a detent tooth system, German patent DE 444 779, or also by means of a ratchet mechanism disposed in the fulcrum of a double-armed lever, wherein at the first lever arm the actuating force generated by the vehicle driver was introduced and at the second lever arm this actuating force was passed on in a geared manner to the brake, wherein both lever arms were pulled by means of helical tension springs of differing strength in such a way about the fulcrum that the stronger helical tension spring pulled the first lever arm onto a stop and the second, weaker helical tension spring pulled the second lever arm back as far as the slack and the tooth system allowed, French patent FR 668 053.

A laborious task that has existed since introduction of the Bowden cable is also that the Bowden cable, after it has been fitted, connected to the hand brake stem in the passenger compartment and connected to the hand brake lever in the drum brake, has to be adjusted in such a way that on the one hand there is no cable slack, which entails lost travel for the hand brake stem, and on the other hand the brake shoes are however still not in frictional engagement with the brake drum.

The prior art includes a drum brake, German patent DE 696 200, in which in the released state of the brake an assembly pin locks the angle lever with the joint rod, wherein in this state the Bowden cable is adjusted. Afterwards, the assembly pin is removed.

From German patent DE 10 220 016, and corresponding U.S. Pat. No. 6,874,600B2, both of which are incorporated by reference herein, an assembly device for the cable pull of a parking brake is known, in which for eliminating the cable slack needed for easy assembly a retaining device is provided, which comprises a displacement sleeve and a fixing sleeve, wherein after assembly of the Bowden cable the displacement sleeve is displaced in the fixing sleeve and secured by means of a radially preloaded spring.

From the German patent DE 3 741 530 an automatic readjusting device for the cables of the parking brake is known, which by means of a torsion spring constantly endeavours to pivot the lever arms of the compensating yoke, which are mounted pivotably relative to one another, in such a way that the cables are tensioned. A ratchet mechanism in this case allows a rotational movement of the lever arms only in the direction of a re-tensioning of the cables.

From the German patent DE 4 023 047 a method of fitting a pre-assembled hand brake device is known. In this case, in order to allow the hand brake stem to be brought vertically through the opening of the base plate, the Bowden cable is fixed in a first position on the bracket by means of a resilient detent connection, and in this position the hand brake cables are also adjusted, and after introducing the hand brake stem into the passenger compartment the bracket is displaced by means of a piston-cylinder unit in such a way that the bracket may be screw-connected to the base plate. During this displacement of the bracket, the Bowden cable takes up its operating position.

Further documents that are concerned with cable stretching in the German patents DE 315 182, DE 1 030 982, DE 4 040 779, DE 19 734 572, and corresponding U.S. Pat. No. USRE 40760E1, both of which are incorporated by reference herein, and in DE-OS 3 103 708 and DE-OS 3 819 177.

From the German utility model DE 8 811 920 a mechanically and hydraulically actuable disc brake is known, in which for adjusting the initial cable tension and for compensating the cable stretching during initial assembly a spacer made of plastics material is introduced between a housing-fixed stop and a stop of the hand brake lever that interacts with said housing-fixed stop, so that the hand brake lever that is pressed by a torsion spring normally against the housing-fixed stop is supported for the initial assembly on this spacer. In this state, the hand brake cable is placed under initial tension until the spacer may be removed without any expenditure of force. The dimension of the thickness of the spacer is tuned to the yielding behaviour of the Bowden cable.

From the German utility model DE 9 209 637 and the European patent EP 579 178 equivalent thereto, a further development of the spacer known from the previously cited utility model DE 8 811 920 is described, to the effect that the spacer is also capable of taking up a tensile force. The hand brake cables may then be machine-adjusted more reliably without minor variations during tightening of the adjusting nuts of the Bowden cable, caused by friction coefficient differences of the thread and tolerances of the screws, leading to significant deviations of the spacing of the stop of the hand brake lever from the housing-fixed stop. This is achieved in that the Bowden cable during the initial tensioning generates a very steep rise in force and hence a steep rise in the torque of the screwdriver, with the result that the screwdriver switches off. After this basic setting, the spacer is broken by a single strong pull on the hand brake stem.

U.S. Pat. No. 6,241,051 B1 describes a brake cable connecting device for fastening a brake cable to a brake lever in a concealed manner in order to reduce the cost and weight of the braking device. The connecting device is formed by a U-shaped channel, which is provided at a free end of the brake lever, and a guide unit for automatically mounting the brake cable on the free end of the brake lever when the brake cable is pushed in the direction of the brake lever. The guide unit, which is manufactured separately from the brake lever, comprises a cable-receiving trough, which is bent into a U shape and mounted in the channel of the brake lever, a guide element for guiding the brake cable in the direction of the free end of the brake lever, and a ramp-shaped surface for deflecting the brake cable when the brake cable moves along its surface to generate a return force in the brake cable. The brake cable as a result of the return force snaps into place in the cable-receiving trough when its end passes the tip of the ramp-shaped surface.

BRIEF SUMMARY OF THE INVENTION

A feature of the invention is to ensure a lasting initial tension of the Bowden cable in a drum brake by simple means.

The feature of the invention is achieved by a retaining plate according to claim 1 and by a method according to claim 6.

The feature is achieved according to the invention also in that a retaining plate holds the hand brake lever in a first position by means of a preloaded spring arm, the Bowden cable is provided with an initial tension, the parking brake is actuated, wherein the pivoting of the hand brake lever enables an unlatching of the spring arm, and wherein the hand brake lever takes up a second position, which is variable with the cable stretching and in which the hand brake lever constantly keeps the Bowden cable under initial tension by means of a spring.

Other advantages of this invention will become apparent to those skilled in the art from the following detailed description of the preferred embodiments, when read in light of the accompanying drawings.

BRIEF DESCRIPTION OF THE DRAWINGS

FIG. 1: an overview of the actuating elements for the parking brake comprising the hand brake stem, the Bowden cable, the drum brake and the brake drum, FIG. 2: the drum brake, FIG. 3: a perspective view of the retaining plate, FIG. 4: a perspective view of the brake shoe with hand brake lever, resetting spring and the retaining plate, FIG. 5: a front view of the brake shoe according to FIG. 4, FIG. 6: a side view of the brake shoe according to FIG. 4, FIG. 7: an enlarged sectional view of the mounting of the hand brake lever on the web plate of the brake shoe, FIG. 8: a first functional representation of the brake shoe with fitted hand brake cable, wherein the resetting spring shown in FIG. 5 holds the hand brake lever via the retaining plate in a stop position on the web plate: adjustment of the basic initial tension of the Bowden cables, FIG. 9: a sectional view according to FIG. 8 through the hand brake lever, the retaining plate and the brake shoe, FIG. 10: a second functional representation of the brake shoe with fitted hand brake cable, wherein the resetting spring shown in FIG. 5 pulls the hand brake lever towards the web plate, and the hand brake stem shown in FIG. 1 pulls the hand brake lever away from the web plate by means of the hand brake cable, and the spring arm of the retaining plate is unlatched from the mounting on the web plate: pulling on the hand brake stem to eliminate the interlock, FIG. 11: a sectional view according to FIG. 10 through the hand brake lever, the retaining plate and the brake shoe, FIG. 12: a third functional representation of the brake shoe with fitted hand brake cable, wherein the resetting spring shown in FIG. 5 pulls the hand brake lever towards the web plate, and the hand brake cable pulls the hand brake lever away from the web plate, and the spring arm of the retaining plate is situated underneath the web plate: operating position of the hand brake lever, FIG. 13: a sectional view according to FIG. 12 through the hand brake lever, the retaining plate and the brake shoe, FIGS. 14, 15 and 16: enlarged representations of FIGS. 9, 11 and 13 as an overview of the interlocking, unlatching and operation, FIG. 17: the hand brake lever and an enlarged view of the recess for securing the position of the retaining plate, FIG. 18: the enlarged region of the hand brake lever with the recess according to FIG. 17 and with the retaining plate secured in the recess, as well as part of the web plate, FIG. 19: a sectional view according to FIG. 18, wherein the web plate is encompassed by the retaining plate.

DETAILED DESCRIPTION OF THE INVENTION

Figure 1:
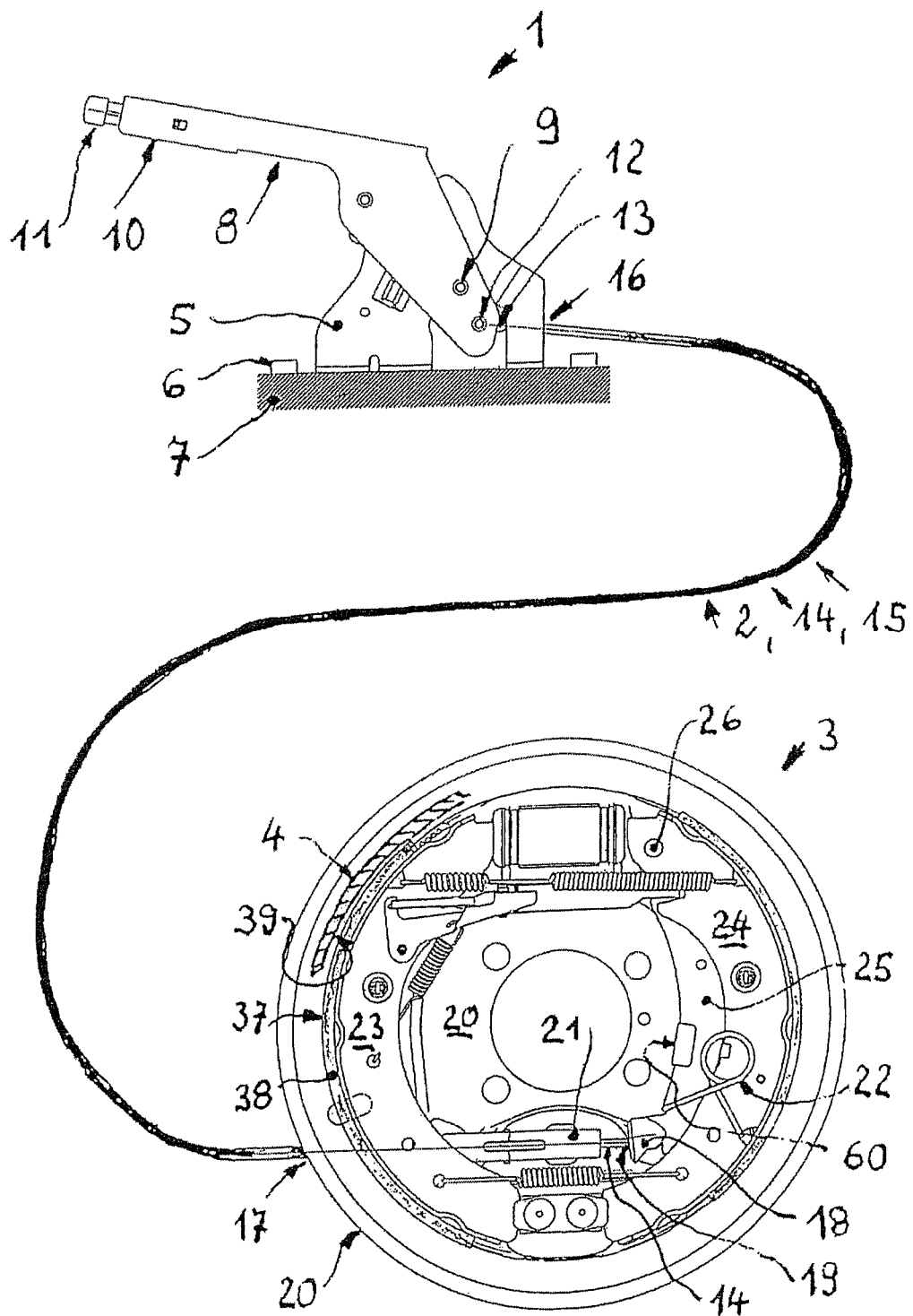
FIGS. 1 to 19 show the first embodiment.

FIG. 1 shows an overview of the actuating elements for a parking brake: the actuating device (1), a Bowden cable (2), a drum brake (3) and a brake drum (4).

The actuating device (1) is connected by a bracket (5) in a fixed manner by means of fastening screws (6) to the vehicle body (7). A hand brake stem (8) is mounted in the bracket (5) and pivotable to a limited extent of ca. 60° about a swivelling axis (9). The hand brake stem (8) comprises a handle (10) and a release button (11) mounted therein. The release button (11) interacts with a release linkage (not shown), which extends inside the hand brake stem (8) and is connected to an immobilizing pawl, which engages into a gear segment connected in a fixed manner to the bracket. The gear segment takes the form of a locking tooth system. A pivoting of the hand brake stem (8) in clockwise direction brings about a sliding of the immobilizing pawl over the locking tooth system and a continuous latching of the immobilizing pawl into the tooth gaps. A return pivoting of the hand brake stem (8) is blocked by the latching of the immobilizing pawl into the tooth gaps. By pressing the release button (11) counter to the action of a compression spring the immobilizing pawl is released from the engagement in the locking tooth system, and the hand brake stem (8) may then be pivoted back. The function of the previously described release linkage is as such generally known.

Situated on the bottom end of the hand brake stem (8) is a coupling bearing (12), which receives a coupling element (13) of the core of the Bowden cable (2), a hand brake cable (14). The one end (16) of a sheath (15) of the Bowden cable (2) is held and supported by a sheath holder in a vehicle-fixed bearing on the bracket (5). The other end (17) of the sheath (15) of the Bowden cable (2) is supported and held by a sheath holder in a vehicle-fixed bearing on an anchor plate (20) of the drum brake (3). The core of the Bowden cable (2), i.e. the hand brake cable (14), penetrates the anchor plate (20), runs through a guide tube (21) and is connected by a coupling element (19) to a coupling bearing (18) of a hand brake lever (25). The hand brake lever (25) is connected by a bearing (26) pivotably to a secondary shoe (24).

If at the handle (10) of the hand brake stem (8) a rotation of the hand brake stem (8) in clockwise direction about the swivelling axis (9) is initiated, then the coupling bearing (12) via the coupling element (13) exerts a tensile force on the core of the Bowden cable (2), the hand brake cable (14). This tensile force propagates through the sheath (15) and is transmitted via the coupling element (19) to the coupling bearing (18) of the hand brake lever (25). The restoring force of the resetting spring (22) acts upon the hand brake lever (25) in the opposite direction to the pulling direction of the hand brake cable (14). Upon further pulling on the handle (10) of the hand brake stem (8) the tensile force in the core of the Bowden cable (29) rises and the hand brake lever (25) pivots about the axis of the bearing (26).

Figure 2:
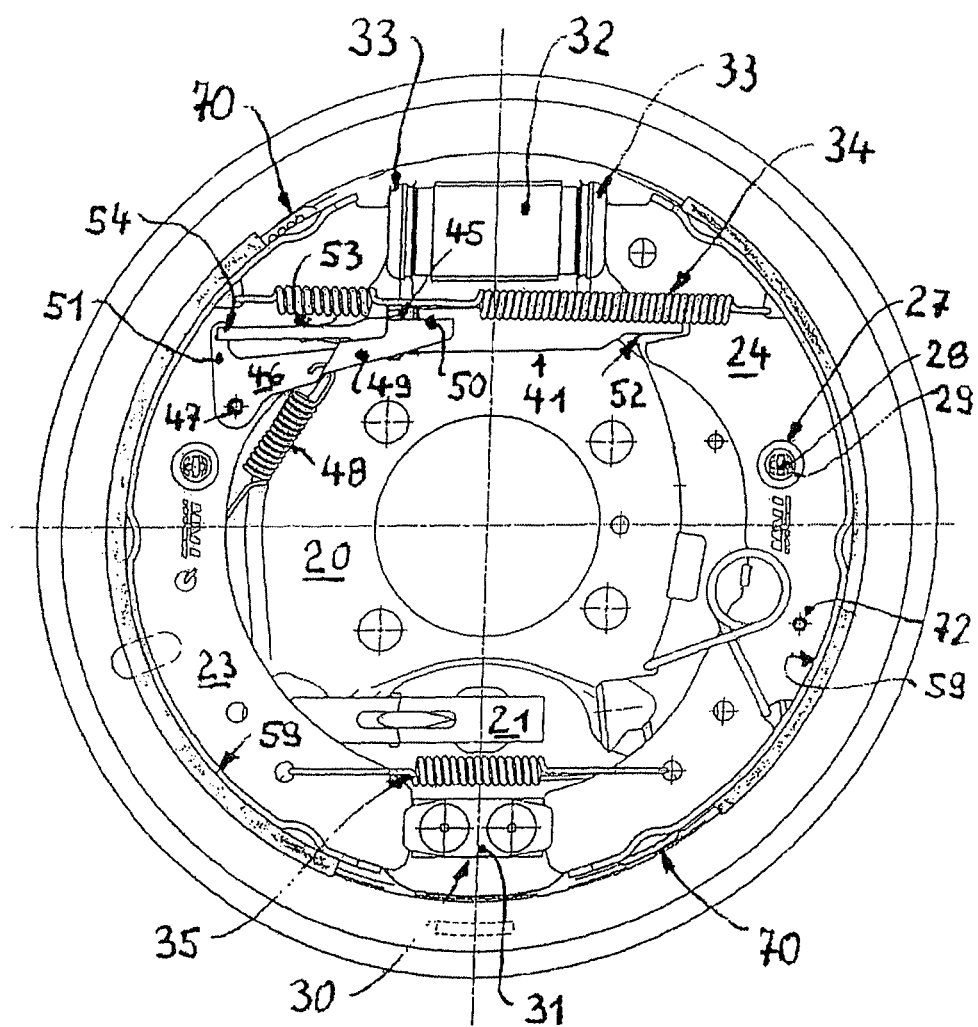

FIG. 2 shows a conventional drum brake (3) used in mass production. It is as such sufficiently known and therefore requires only a brief summary.

On the anchor plate (20) a primary shoe (23) and a secondary shoe (24) are held by means of hold-down springs (27), hold-down pins (28) and spring cups (29). The bottom end of the primary shoe (23) and the bottom end of the secondary shoe (24) are supported in peripheral direction by the ends of their web plates (36) (FIG. 4) against a support plate that is disposed between the dome (30) and the lay-on plate (31). The lay-on plate (31) overlaps the support plate and its right and left ends project beyond the support plate. Lay-on plate (31) and support plate together with the dome (30) are connected by rivets. The lay-on plate (31) forms a further axial support for the primary and the secondary shoes (23, 24).

Between the top end of the primary shoe (23) and the top end of the secondary shoe (24) a wheel brake cylinder (32) is disposed. In it two pistons are situated. The pistons are sealed off by means of lip ring seals. V-ring seals (33) prevent dirt and moisture from penetrating into the wheel brake cylinder (32). The hydraulic pressure that is generated in the master cylinder by means of the brake pedal and is optionally increased by a booster or reduced by a slip control system is directed onto the cross-sectional area of the pistons.

A top return spring (34) and a bottom return spring (35) are fitted into the web plates (36) of the primary shoe (23) and the secondary shoe (24) and constantly pull these towards one another until, on the one hand, the primary shoe (23) rests against the one side of a variable-length strut (41) and, on the other hand, the secondary shoe (24) is supported via the bearing (26) on the hand brake lever (25) and by the latter via the recess (52) on the other side of the variable-length strut (41). In this case, the coupling bearing (18) supports the torque, which is generated by the force transmitted in the hand brake lever (25) via the lever arm into the recess (52), against the coupling element (19) of the hand brake cable (14). The hand brake cable (14) transmits the force generated by the torque via the bracket-side coupling element (13) into the coupling bearing (12), where it is transmitted via the hand brake stem (8) and the immobilizing pawl to the gear segment connected in a fixed manner to the bracket (5).

The forces effective from the top and the bottom return spring (34, 35) in the bottom region of the web plates (36) of the primary shoe (23) and the secondary shoe (24) are taken up by a support plate, which is riveted to the dome (30).

After termination of the braking operation and retraction of the primary- and secondary shoes (23, 24), the friction surfaces (37) of the brake linings (38) are always at a distance, the release clearance (40), from the friction surface (39) of the brake drum (4). In conventional drum brakes (3) in the passenger car sector the release clearance, which is the sum of the distance of the friction surface (37) of the primary shoe (23) from the friction surface (39) of the brake drum (4) and the distance of the friction surface (37) of the secondary shoe (24) from the friction surface (39) of the brake drum (4), is approximately 0.5 millimetres.

The correct distance, the release clearance (40), is regulated by means of an automatic readjustment device. The variable-length strut (41) comprises a tubular pressure sleeve (42), which is supported by its right end in a recess (52) of the hand brake lever (25) and mounted by its tubular left end telescopically on the thread of the push rod (43) and therefore also protects this thread from becoming clogged with brake dust. The push rod (43) is supported by its left end in a recess (53) of the web plate (36) of the primary shoe (23) and mounted by its threaded right portion in the pressure sleeve (42). A readjustment pinion (44) has an internal thread, by which it is screwed onto the external thread of the push rod (43). The right side wall of the readjustment pinion (44) forms the stop for the pressure sleeve (42). By rotating the readjustment pinion (44) the strut (41) is variable in length.

The readjustment pinion (44) has on its outer circumference a locking tooth system (45). A two-armed readjustment lever (46) is mounted rotatably about a clamping sleeve (47). The right lever arm (49) has on its end an angular portion in the form of a blade (50), which engages into the locking tooth system (45). The left lever arm (51) engages into a U-shaped cutout (54) of the push rod. A readjustment spring (48) constantly exerts a tensile force on the right lever arm (49) so that the right lever arm (49) constantly endeavours to rotate the readjustment pinion (44) in the direction of a readjustment. The previously outlined construction of the drum brake is as such well-known to the person skilled in the art and for this reason has been described above only with regard to the essential components. The same applies also to the following description of the actuation of the drum brake.

When the drum brake (3) is hydraulically actuated, most of the retraction forces of the top and the bottom return springs (34, 35), which in the non-actuated state of the drum brake (3) are supported on the strut (41), are then supported via the pistons on the hydraulic fluid. In this state, the right lever arm (49) may by means of the blade (50) rotate the readjustment pinion (44), provided that the release clearance (40) has become so great that the movement of the blade (50) is greater than the distance, in relation to the length at the long tooth flank of the tooth of the locking tooth system (45), between the start of the movement and abutment of the blade (50) with the short tooth flank, so that the blade (50) drives the short tooth flank and hence minimally rotates the readjustment pinion (44).

If upon release of the brake by return rotation of the right lever arm (49) the movement of the blade (50) exceeds the length of the long tooth flank, then the blade (50) latches behind the short tooth flank of the next locking tooth.

In design terms, the basic release clearance is defined by the length of the long tooth flank, provided that the locking teeth are distributed uniformly on the circumference of the readjustment pinion (44) and there are no tooth gaps, and by the length of the two lever arms (49, 51).

Upon hydraulic actuation of the drum brake (3), the hydraulic fluid in the wheel brake cylinder (32) is pressurized. This pressure acts upon the cross-sectional surfaces of the two pistons and generates forces, which are proportional to the pressure and the cross-sectional surfaces and are transmitted to the top end of the primary shoe (23) and the top end of the secondary shoe (24). If these forces exceed the forces of the top and bottom return spring (34, 35) that oppose them, the friction of the lip ring seals that seal off the pistons in the wheel brake cylinder (32) and the friction of the lining plates (59) on the contact surfaces (70) of the anchor plate (20), then primary- and secondary shoes (23, 24) are displaced towards the brake drum (4). The friction surfaces (37) of the brake linings (38) come into frictional engagement with the friction surface (39) of the brake drum (4). The friction forces are removed via the dome (30) into the vehicle-fixed anchor plate (20).

The hydraulic actuation of the drum brake (3) is conventionally provided as a service brake.

Upon mechanical actuation of the drum brake (3), by means of the hand brake stem (8) a tensile force is exerted via the hand brake cable (14) on the hand brake lever (25).

Figure 7:
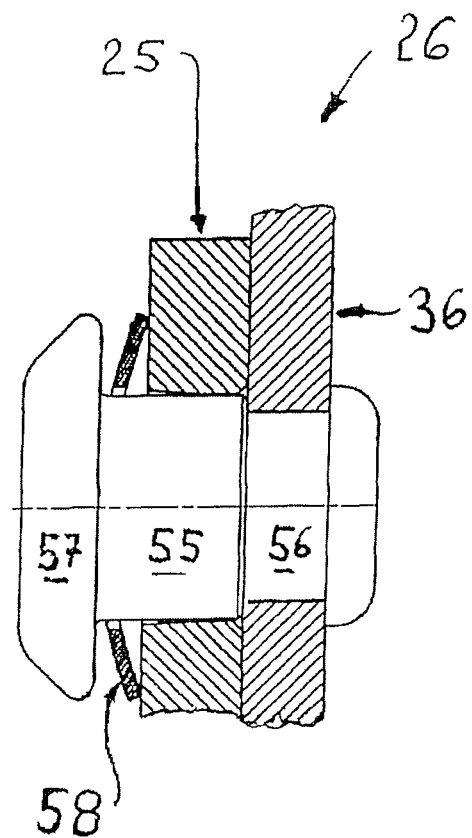

The hand brake lever (25) is mounted in its upper region, FIG. 7, on the web plate (36) of the secondary shoe (24). The bearing (26) comprises a stepped stud (55), the reduced region (56) of which penetrates the web plate (36) and is riveted thereto. A cup spring (58) between head (57) and hand brake lever (25) constantly presses the hand brake lever (25) against the web plate (36), wherein it is ensured that a slight degree of freedom of the hand brake lever (25) allows an alignment of the coupling bearing (18) with the direction of force of the brake cable in the coupling element (19).

The kinematics of the drum brake (3) with automatic readjustment and hydraulic and mechanical actuation are extremely complicated but are, as such, prior art.

From a simplified viewpoint, at the start of the introduction of force by means of the bearing (26) and the resetting spring (22), the hand brake lever (25) forms with the secondary shoe (24) an approximately fixed constructional unit. The tensile force introduced onto the coupling bearing (18) exerts a force oriented to the left upon the constructional unit. This force endeavours to pivot this constructional unit leftwards about the support on the dome (30). However, the force of the resetting spring (22) is as a rule not dimensioned high enough to allow it also to transmit the friction force of the secondary shoe (24), which is generated by the hold-down spring (27) between the lining plate (59) and the contact surfaces (70), and the friction force of the lip ring seal during displacement of the piston in the wheel brake cylinder (32). For this reason, this mechanism is mostly ruled out for the actual sequence of motion.

The hand brake lever (25) pivots about the bearing axis of the bearing (26). From a physical viewpoint, the hand brake lever (25) at the start of the force introduction forms a single-armed lever, which during the rise of the lever forces becomes a two-armed lever.

The pivoting of the hand brake lever (25) is transmitted via the recess (52), the pressure sleeve (42), the readjustment pinion (44), the push rod (43) and the recess (53) to the web plate (36) of the primary shoe (23). The primary shoe (23) is pressed against the friction surface (39) of the brake drum (4). A further pivoting of the hand brake lever (25) leads to a steep rise of the reaction force in the recess (52) of the hand brake lever (25). The hand brake lever (25) then becomes a two-armed lever, wherein the fulcrum lies in the recess (52), and the bearing (26) forms the end of the second lever arm. The secondary shoe (24) is then pressed against the friction surface (39) of the brake drum (4). The friction forces are removed via the dome (30) into the vehicle-fixed anchor plate (20).

The mechanical actuation of the drum brake (3) is conventionally provided as a parking brake.

In order in the previously described drum brake to ensure a lasting initial tension of the Bowden cable, a retaining plate (60) of the type described below is provided.

Figure 3:
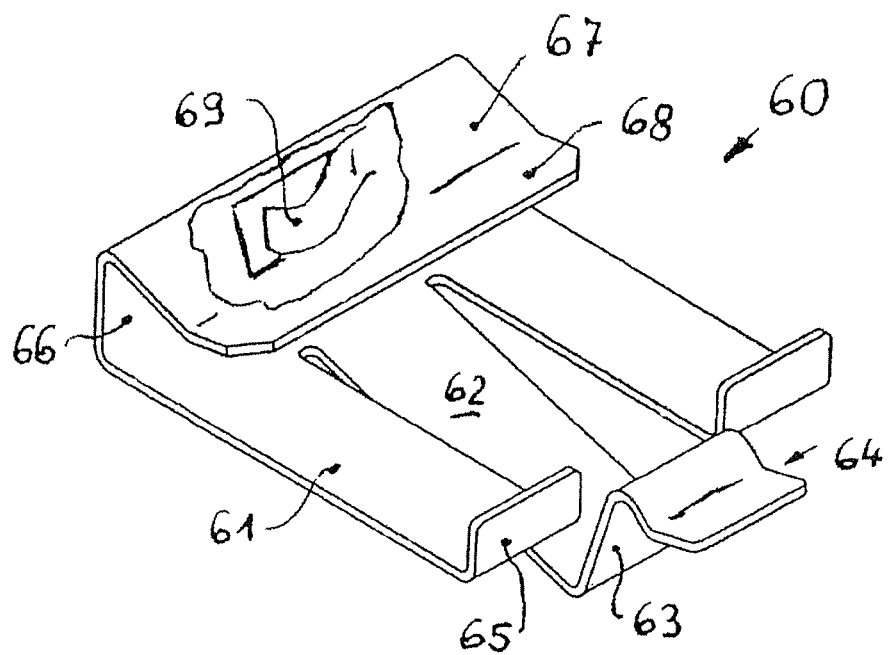
Figure 4:
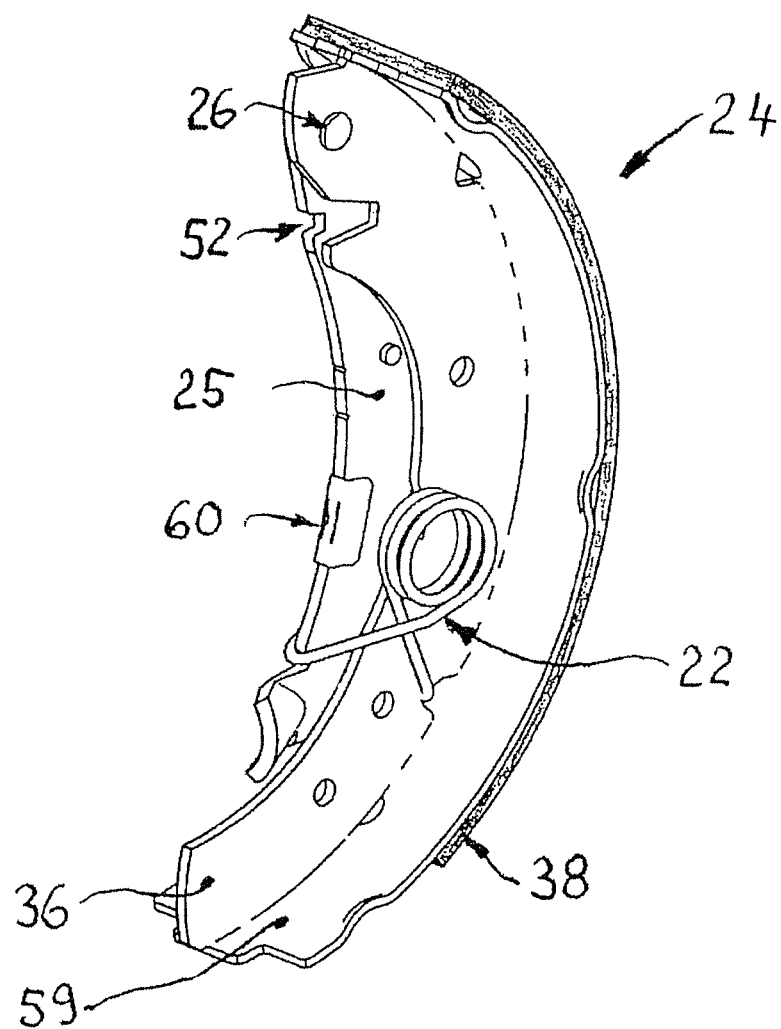

FIG. 3 shows the retaining plate (60) in an enlarged perspective view and FIG. 4 shows the installation of the retaining plate (60) together with the secondary shoe (24).

The retaining plate (60) comprises a plane (61), away from the central part of which a spring arm (62) is bent downwards at an angle of ca. 15°. The spring arm (62) has on its free end an upwardly directed right-angled bend (63), which is adjoined by a further bend (64) directed away from the connection of the spring arm (62) to the plane (61). The right free ends (65) of the plane (61) are bent upwards at a right angle.

The height of the right free, bent ends (65) is tuned to the sheet metal thickness of the hand brake lever (25) in such a way that, when the plane (61) rests on the hand brake lever (25), the free ends (65) do not project beyond the plane of the hand brake lever (25) facing the web plate (36).

The height of the bend (63) of the spring arm (62) is so dimensioned that, when the spring arm (62) rests against the side of the hand brake lever (25) remote from the web plate (36), the bend (64) may come to lie on the side of the web plate (36) remote from the hand brake lever (25). The height is minimally, preferably approximately a half to one millimetre, greater than the sum of the sheet metal thicknesses of the hand brake lever (25) and the web plate (36).

Extending in the left region is a further bend (66), which is directed upwards at a right angle and the height of which is approximately one to two millimetres greater than the sheet metal thickness of the hand brake lever (25). The bend (66) is adjoined by a further bend (67) directed slightly down towards the plane (61). The angle included between the bend (66) and the bend (67) is approximately 75°. The bend (67) is followed by a final bend (68), the plane of which with the plane (61) includes an angle of approximately 15°.

The plane of the bend (66) has an opening with a curved spring tongue (69).

The retaining plate (60) is slipped onto the hand brake lever (25), wherein the bend (68) slides along the surface of the hand brake lever (25) until the ends (65) engage behind the hand brake lever (25). The hand brake lever (25) has a cutout (71), into which the spring tongue (69) latches and thereby ensures the correct position of the retaining plate (25). By virtue of the fact that the height of the bend (66) is greater than the sheet metal thickness of the hand brake lever (25) and the bend (69) extends inclined towards the plane (61), the hand brake lever (25) is clamped with a design-determined spring force in between the plane (68) and the plane (61). The retaining plate (25) is therefore fastened securely against loss throughout the long service life of the drum brake (3).

Figure 5:
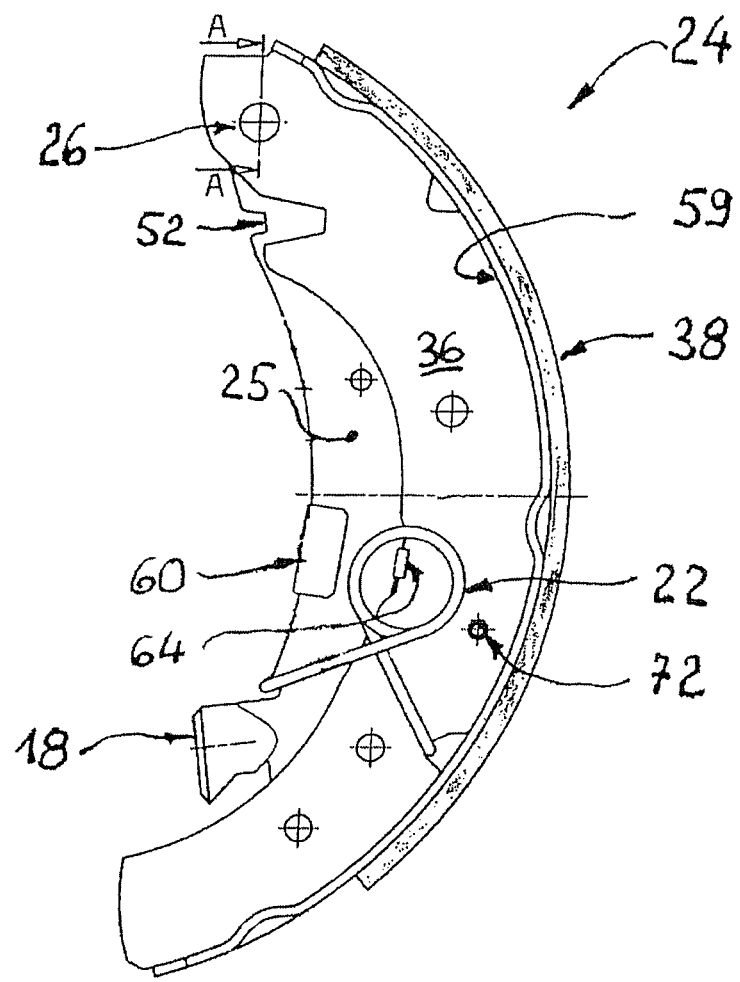
Figure 6:
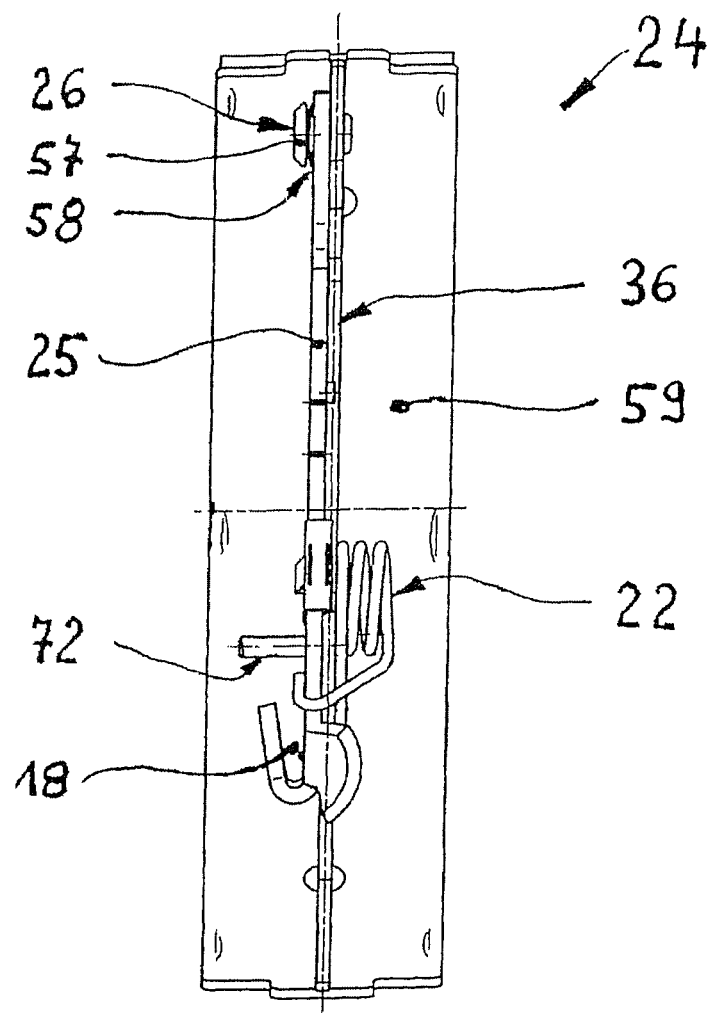

FIGS. 4, 5 and 6 show the secondary shoe (24) in a preassembly stage. The hand brake lever (25) is fastened by the bearing (26) and the web plate (36) pivotably to the secondary shoe (24). The resetting spring (22) is moreover fitted into the web plate (36) and into the hand brake lever (25). The retaining plate (60) is supported by the bend (69) on the web plate (36) against the force of the resetting spring (22) and therefore prevents a further pivoting of the hand brake lever (25) under the web plate (36).

In this preassembled state, the secondary shoe (24) is mounted on the anchor plate (20). After mounting of the wheel brake cylinder (32), the primary shoe (23), the readjustment parts and the return springs (34, 35), the drum brake (3) as such is fully assembled. At this stage it is screw-fastened to the axle, and the brake drum is mounted.

After or even during mounting of the axle on the vehicle body the hand brake cable (14) is pushed through the guide tube (21), wherein the coupling element (19) of the hand brake cable latches automatically into the coupling bearing (18) of the hand brake lever (25). A stop in the form of a clamping sleeve (72) prevents the coupling element (19) from being pushed too far through and avoids the risk of incorrect assembly associated therewith. The hand brake cable (14) is connected by the coupling element (13) to the coupling bearing (12).

Figure 8:
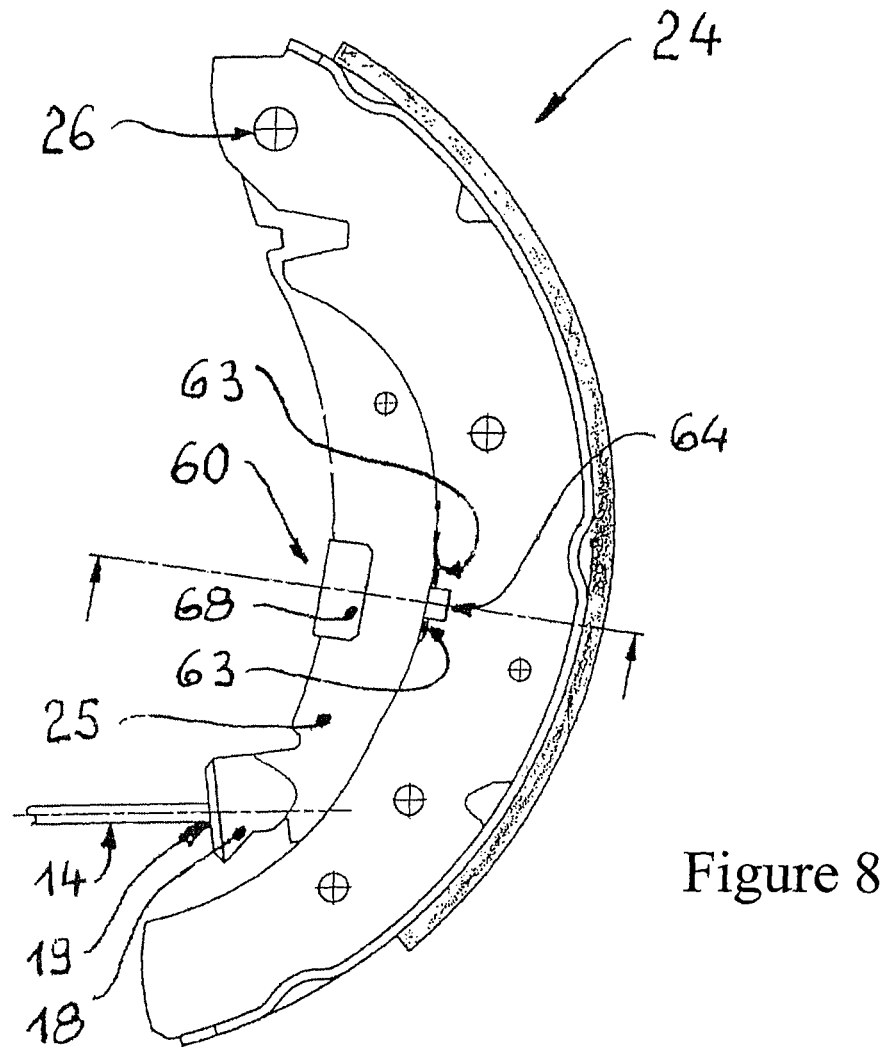
Figure 9:
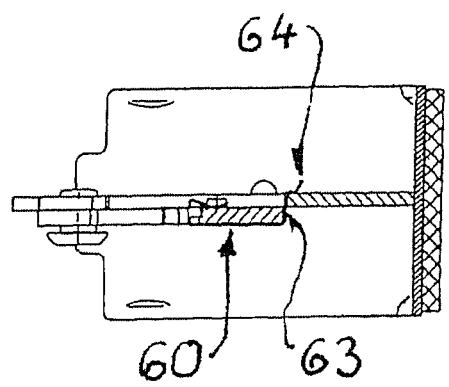
Figure 10:
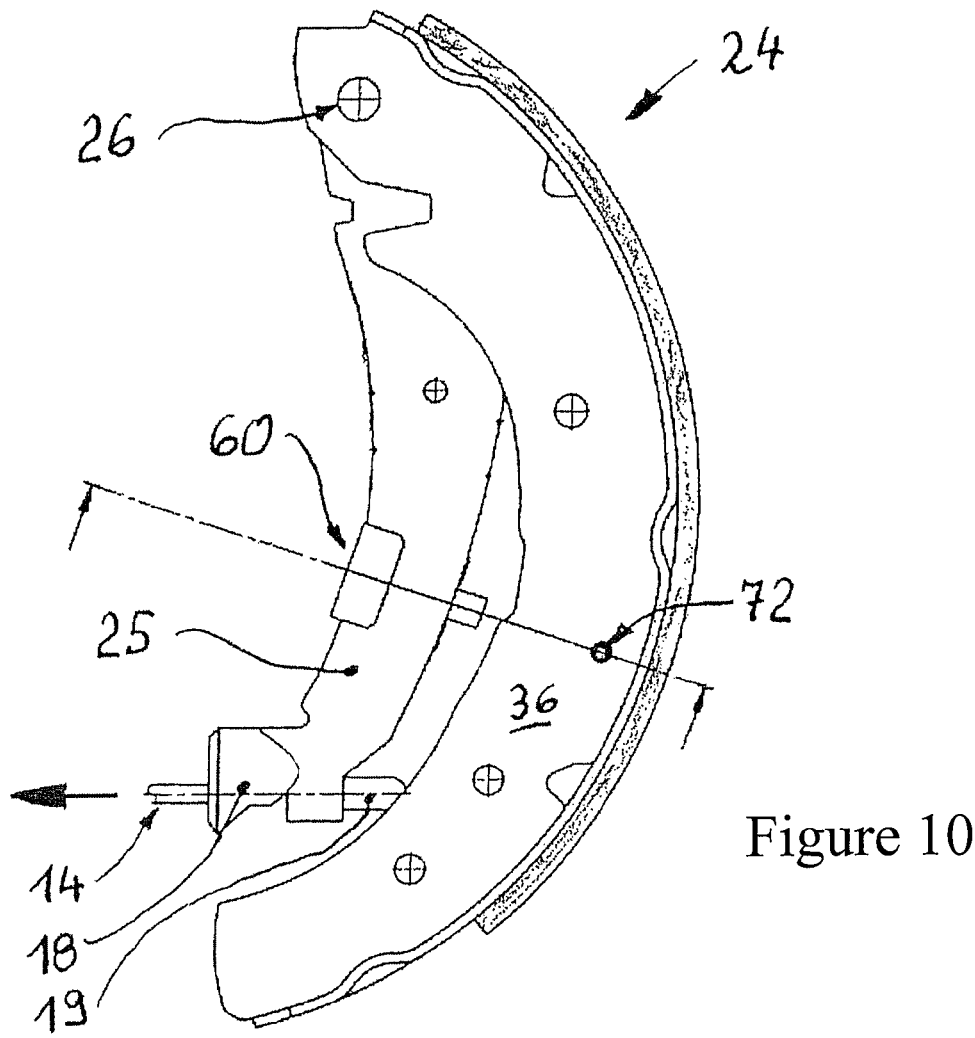
Figure 14:
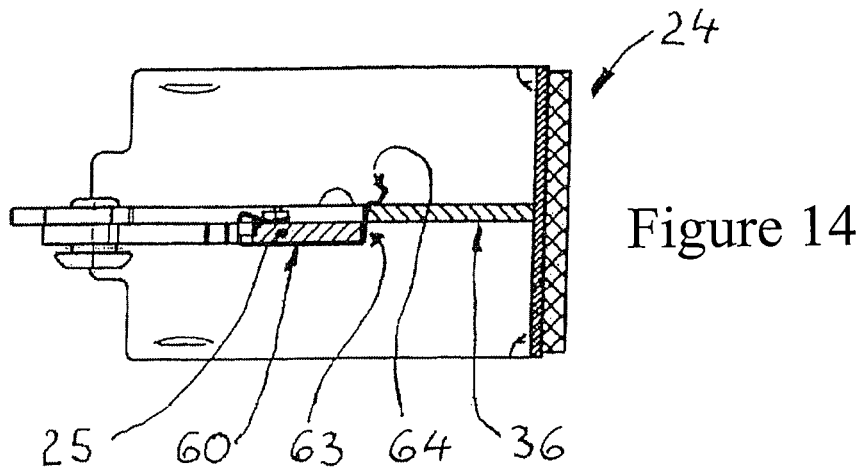

The initial tension of the hand brake cable (14) is then adjusted. During this process, the retaining plate (60) keeps the position represented in FIGS. 8, 9 and 14. The initial tension of the hand brake cable (14), reduced by the friction forces in the joints and in the Bowden cable (2), does not overcome the force of the resetting spring (22).

Figure 11:
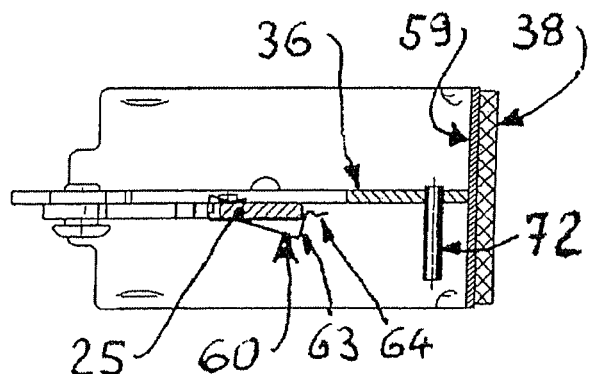
Figure 15:
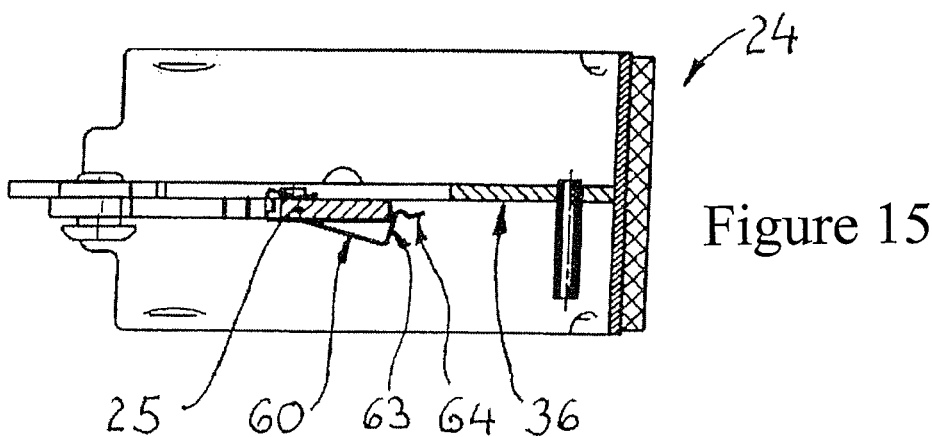
Figure 19:
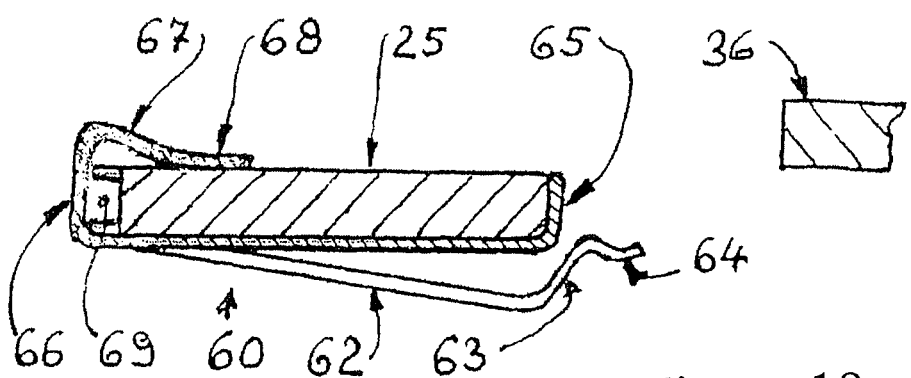

After adjustment of the initial tension of the hand brake cable (14) a single powerful pull on the hand brake stem (8) is effected. In this case, the bend (64) is unlatched from the web plate (36) and the spring arm (62) draws the bend (64) so far down that the bend (64) lies underneath the web plate (36). This is represented in FIGS. 19, 11 and 15.

Figure 12:
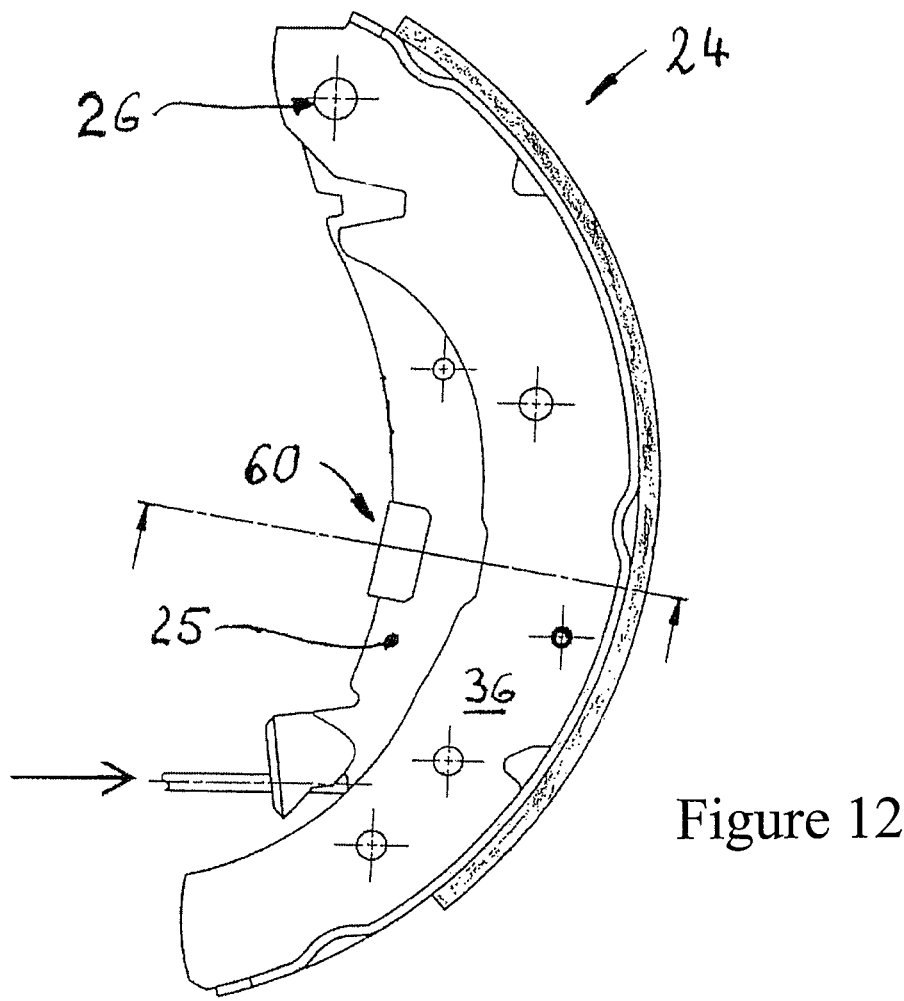
Figure 13:
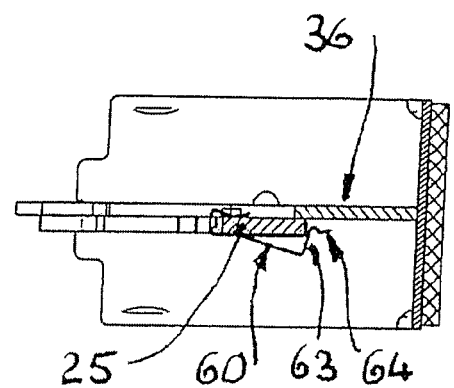
Figure 16:
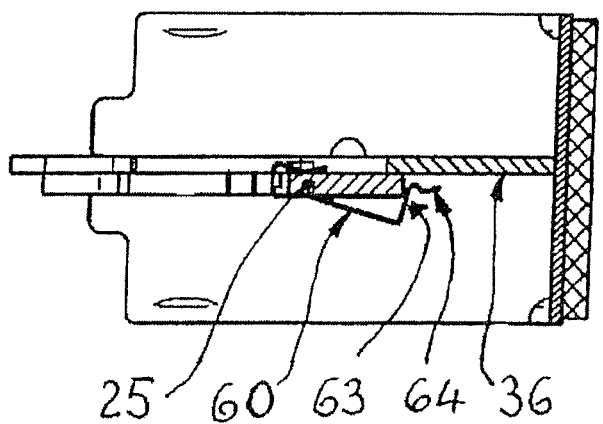
Figure 17:
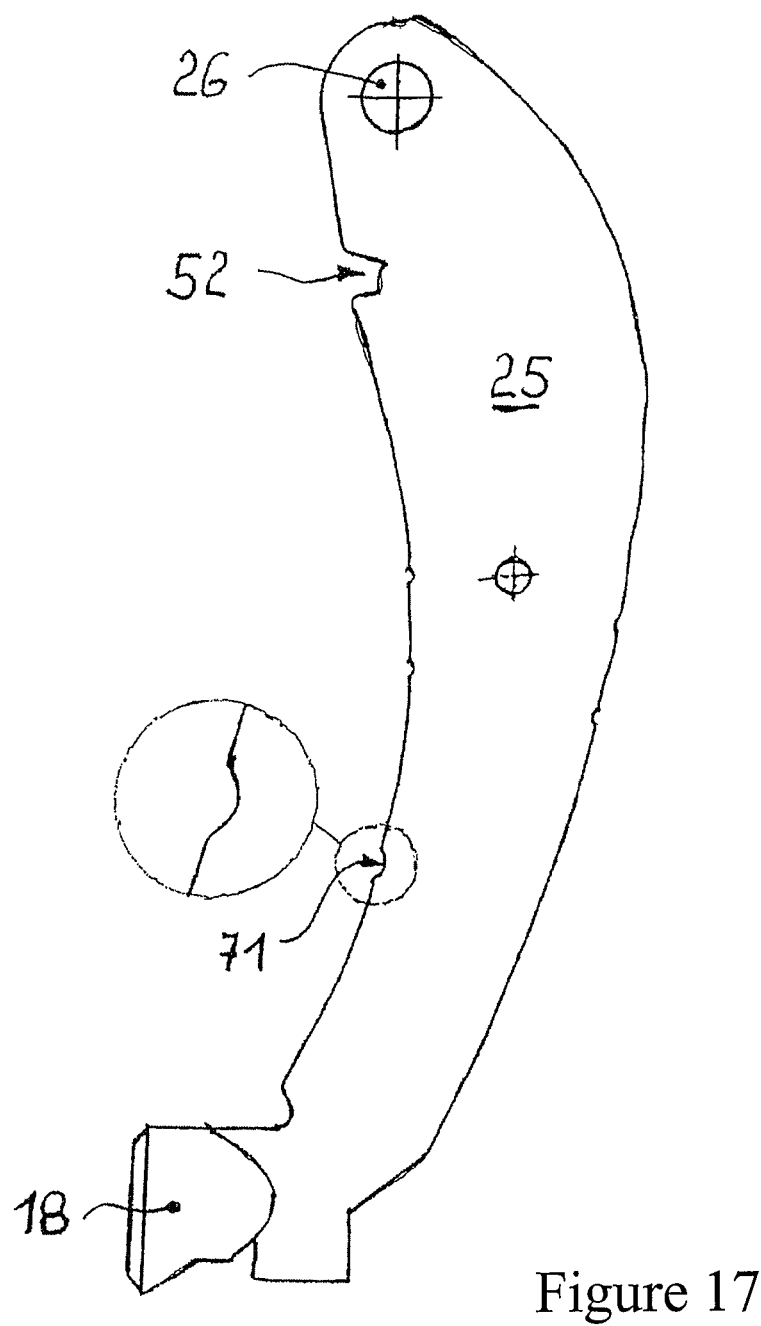
Figure 18:
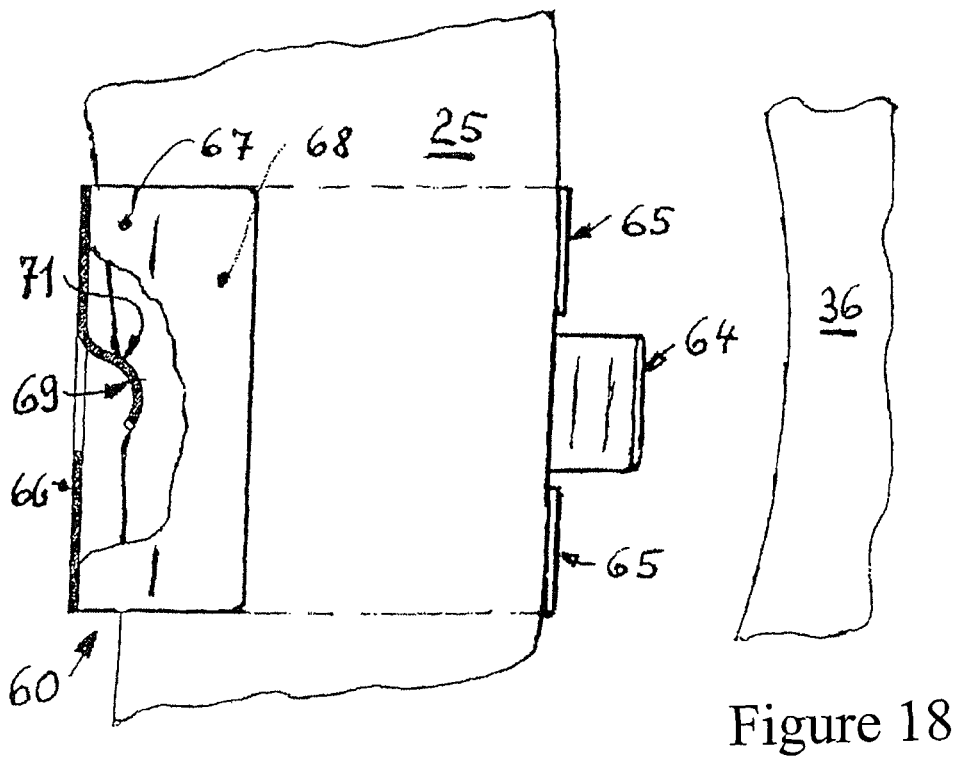

When the hand brake stem (8) is returned to its original position, the resetting spring (22) retracts the hand brake lever (25). The bend (64) engages under the web plate (36). This is represented in FIGS. 12, 13 and 16. If over the years the hand brake cable (14) stretches, then by virtue of the continuous force of the resetting spring (22) a design-determined initial tension is constantly maintained.

Figure 20:
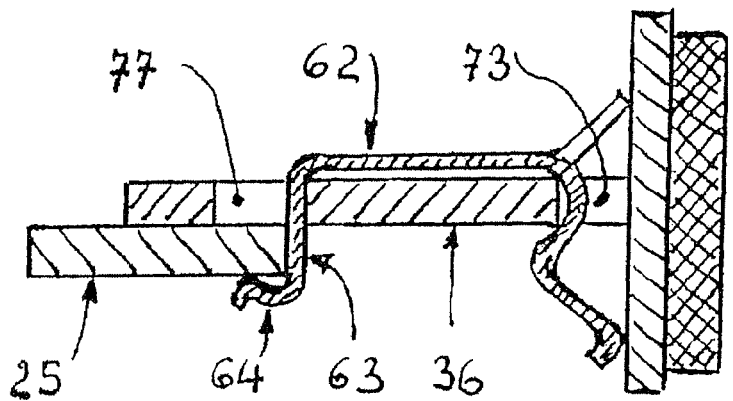
FIG. 20: the second embodiment.
Figure 21:
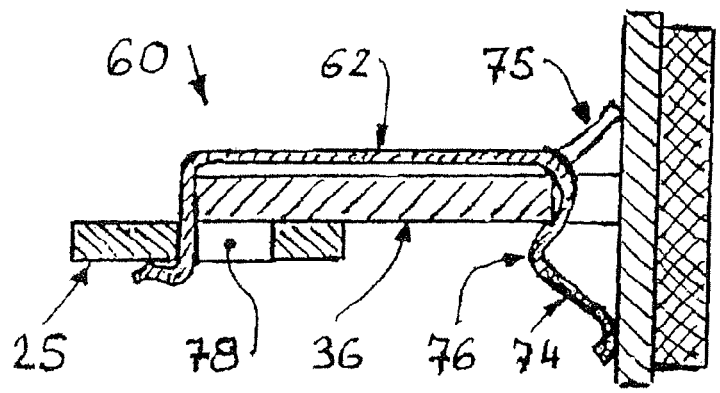
FIG. 21: the third embodiment.
Figure 22:
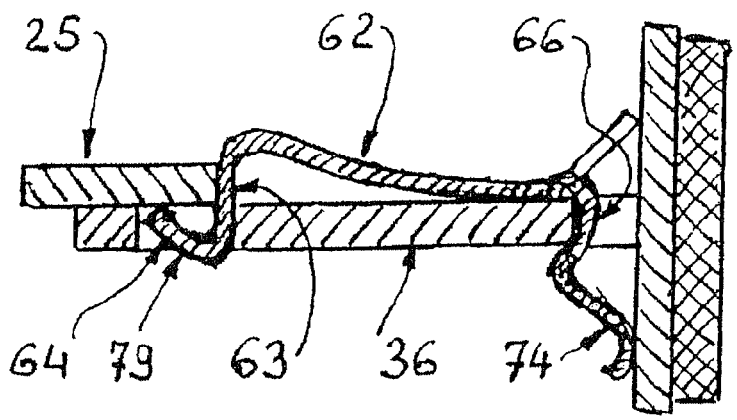
FIG. 22: the fourth embodiment.

FIGS. 20, 21 and 22 show a second, a third and a fourth embodiment.

In these three embodiments the retaining plate (60) is fastened to the web plate (36).

Common to all three embodiments is a cutout (73) in the web plate (36) that extends as far as the lining plate (59). Equally common to all three embodiments is the spring arm (62) and the bend (66), which adjoins the spring arm (62) and has the adjoining spring tongue (74) and the two spring tongues (75) adjoining the spring arm (62). The spring tongues (74, 75) are supported on the lining plate (59) and in this case press the bend (66) against the web plate (36). The spring tongues (74, 75) form a three-point support on the lining plate (59), with the result that the spring arm (62) is cleanly supported. The spring tongue (74) has, adjacent to the bend (66), the shape of a wave (76), wherein part of this wave (76) engages behind the web plate (36). The latching of the retaining plate (60) in the cutout (73) of the web plate (36) is thereby ensured.

The spring arm (62) is adjoined by a bend (63), which is in turn adjoined by a further bend (64).

In the second embodiment according to FIG. 20, the bends (63, 64) of the spring arm (62) engage through a cutout (77) of the web plate (36). The bend (64) engages under the hand brake lever (25). The force of the resetting spring (22) is transmitted from the hand brake lever (25) via the bend (63) to the web plate (36).

When the hand brake lever (25) after adjustment of the initial tension of the hand brake cable (14) is drawn away from the web plate (36) by pulling the hand brake stem (8), the cutout (77) is released and the spring arm (62) latches with the bend (63) out of the mounting of the hand brake lever (25). The spring arm (62) then pulls the bends (63, 64) through the cutout (77).

When the hand brake stem (8) is returned to its normal position, the resetting spring (22) retracts the hand brake lever (25) and provides the hand brake cable lastingly with a defined initial tension.

The third embodiment according to FIG. 21 differs from the second embodiment merely in that the bends (63, 64) of the spring arm (62) engage through a cutout (78) of the hand brake lever (25).

Both in the second and in the third embodiment the hand brake lever (25) is situated underneath the web plate (36), i.e. in the space between web plate (36) and anchor plate (20).

The fourth embodiment according to FIG. 22 differs from the second embodiment merely in that the hand brake lever (25) is situated above the web plate (36), with the result that the spring arm (62) after unlatching from the cutout (77) has to pivot far enough upwards to allow the hand brake lever (25) to pivot into the free space between the bend (64) and the web plate (36). This upward pivoting is however limited by the brake drum (4), in relation to which a minimum clearance of several millimetres is to be observed. To ensure this, the bend (64) is angled in such a way that the hand brake lever (25) upon encountering this angled bend (64) may lift it slightly. The transition region (79) from the bend (64) to the bend (63) then slides on the hand brake lever (25).

By virtue of the invention a retaining plate (60) is provided, by means of which for the initial assembly of the drum brake (3) the hand brake lever (25) is interlocked with the web plate (36) counter to the action of the resetting spring (22).

After assembly of the Bowden cable (2) and adjustment of the initial tension of the hand brake cable (14) the interlock may be cancelled by pulling powerfully on the hand brake stem (10).

If over many years the hand brake cable (14) stretches, the initial tension of the hand brake cable (14) is nevertheless constantly maintained.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

LIST OF REFERENCE CHARACTERS 1 actuating device
2 Bowden cable
3 drum brake
4 brake drum
5 bracket
6 fastening screws
7 vehicle body
8 hand brake stem
9 swivelling axis
10 handle
11 release button
12 coupling bearing, bracket-side
13 coupling element, bracket-side
14 hand brake cable
15 sheath
16 end of sheath, bracket-side
17 end of sheath, anchor-plate-side
18 coupling bearing, hand-brake-lever-side
19 coupling element, hand-brake-lever-side
20 anchor plate
21 guide tube
22 resetting spring
23 primary shoe
24 secondary shoe
25 hand brake lever
26 bearing
27 hold-down spring
28 hold-down pin
29 spring cup
30 dome
31 lay-on plate
32 wheel brake cylinder
33 V-ring seal
34 top return spring
35 bottom return spring
36 web plate
37 friction surface of brake lining
38 brake lining
39 friction surface of brake drum
40 release clearance
41 variable-length strut
42 pressure sleeve
43 push rod
44 readjustment pinion
45 locking tooth system
46 readjustment lever
47 clamping sleeve
48 readjustment spring
49 right lever arm
50 blade
51 left lever arm
52 recess in hand brake lever
53 recess in primary shoe
54 U-shaped cutout in push rod
55 stepped stud
56 reduced region of stud
57 head
58 cup spring
59 lining plate
60 retaining plate
61 plane
62 spring arm
63 bend of spring arm
64 bend
65 end
66 bend
67 bend
68 final bend
69 curved spring tongue
70 contact surfaces of lining plate on anchor plate
71 cutout in hand brake lever
72 clamping sleeve
73 cutout in web plate, adjacent to lining plate
74 spring tongue
75 spring tongue
76 wave
77 cutout in web plate
78 cutout
79 transition region

The invention claimed is:

1. Retaining plate for a hand brake lever of a drum brake having a primary shoe and a secondary shoe and the hand brake lever, which is mounted on a web plate of the primary shoe or of the secondary shoe, and a resetting spring, which pulls or presses the hand brake lever constantly towards the web plate, wherein the retaining plate is held positively on one of the hand brake lever and the web plate and the retaining plate by means of a bend provided on a spring arm of the retaining plate transmits a force of the resetting spring to the web plate and wherein the retaining plate is provided with an opening having a curved spring tongue which is configured to latch into a cutout provided in the hand brake lever in order to thereby position the retaining plate on the hand brake lever and secure the position of the retaining plate.

2. Retaining plate according to claim 1, wherein the bend of the spring arm is adjoined by a further bend.

3. Retaining plate according to claim 1, wherein in an additional bend of the retaining plate, the curved spring tongue is formed.

4. Drum brake having the retaining plate according to claim 1.

5. Drum brake having the retaining plate according to claim 1, wherein the retaining plate includes only a single curved spring tongue which is configured to latch into only a single cutout in the hand brake lever in order to thereby position the retaining plate on the hand brake lever and secure the position of the retaining plate.

6. Method of generating a lasting initial tension of a Bowden cable in a drum brake comprising a brake drum, wherein the drum brake is actuable hydraulically and mechanically and has an automatic readjustment device comprising a variable-length strut, which is readjustable by means of a pawl and ratchet wheel mechanism, wherein the strut is supported on one end by one of the two brake shoes, namely a primary brake shoe or a secondary brake shoe, and on another end by a recess of a hand brake lever, which is mounted on the other of the two brake shoes, secondary shoe or primary shoe, wherein a resetting spring pulls or presses the hand brake lever constantly towards a web plate, on which the hand brake lever is mounted, wherein a retaining plate, which is held on the hand brake lever or the web plate, during the initial assembly of the drum brake blocks a pivoting of the hand brake lever about a bearing towards the web plate by means of a bend, which is loaded with a spring force acting in an unlocking direction and engages between the hand brake lever and the web plate; a further bend, which adjoins the bend and is supported on the web plate or the hand brake lever and removes the spring force acting in unlocking direction upon the bend and not taken up by the frictional engagement between the hand brake lever and the web plate, after assembly of the Bowden cable and adjustment of the initial tension of a hand brake cable is pulled by means of a hand brake stem, wherein the hand brake lever pivots about the bearing and moves away from the web plate, and wherein the further bend slides on the web plate or the hand brake lever until a spring arm releases the bend and the further bend, and the force of the resetting spring constantly maintains a produced initial tension of the hand brake cable.

7. A drum brake comprising:

a hand brake lever supported on one of a primary shoe and a secondary shoe of the drum brake;

a retaining plate for the hand brake lever mounted on a web plate of one of the primary shoe and the secondary shoe; and a resetting spring which pulls or presses the hand brake lever constantly towards the web plate;

wherein the retaining plate is held positively on one of the hand brake lever and the web plate and the retaining plate by means of a bend provided on a spring arm of the retaining plate transmits a force of the resetting spring to the web plate and wherein the retaining plate is provided with an opening having a curved spring tongue which is configured to latch into a cutout provided in the hand brake lever in order to thereby position the retaining plate on the hand brake lever and secure the position of the retaining plate.

8. The drum brake according to claim 7 wherein the retaining plate includes only a single curved spring tongue which is configured to latch into only a single cutout in the hand brake lever in order to thereby position the retaining plate on the hand brake lever and secure the position of the retaining plate.

* * * * *